United States Patent
Shiozaki

(10) Patent No.: US 10,479,182 B2
(45) Date of Patent: Nov. 19, 2019

(54) SHIFT CONTROL SYSTEM FOR VEHICLE

(71) Applicant: Toyota Jidosha Kabushiki Kaisha, Toyota-shi (JP)

(72) Inventor: Junichi Shiozaki, Atsugi (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 15/902,546

(22) Filed: Feb. 22, 2018

(65) Prior Publication Data

US 2018/0244144 A1    Aug. 30, 2018

(30) Foreign Application Priority Data

Feb. 24, 2017    (JP) .................................. 2017-033453

(51) Int. Cl.

| | |
|---|---|
| *B60W 30/20* | (2006.01) |
| *B60K 6/387* | (2007.10) |
| *F16H 61/06* | (2006.01) |
| *B60W 20/19* | (2016.01) |
| *B60K 6/445* | (2007.10) |

(Continued)

(52) U.S. Cl.
CPC ............. *B60K 6/387* (2013.01); *B60K 6/445* (2013.01); *B60W 10/06* (2013.01); *B60W 20/19* (2016.01); *B60W 30/19* (2013.01); *B60W 30/20* (2013.01); *F02D 41/023* (2013.01); *F02P 5/1504* (2013.01); *F16H 3/666* (2013.01); *F16H 61/061* (2013.01); *B60W 2050/0014* (2013.01); *B60W 2510/0604* (2013.01); *B60W 2510/1025* (2013.01); *B60Y 2300/20* (2013.01); *F16D 2500/3065* (2013.01);

(Continued)

(58) Field of Classification Search
None
See application file for complete search history.

(56) References Cited

U.S. PATENT DOCUMENTS 4,790,418 A * 12/1988 Brown ................. F16H 61/061
                                                              192/103 F
2007/0117677 A1   5/2007 Ayabe et al.
(Continued)

FOREIGN PATENT DOCUMENTS

| JP | 62-194068  | 8/1987  |
|----|------------|---------|
| JP | 2005-313786 | 11/2005 |

(Continued)

*Primary Examiner* — Justin Holmes
(74) *Attorney, Agent, or Firm* — Oblon, McClelland, Maier & Neustadt, L.L.P.

(57) ABSTRACT

A shift control system includes a controller that controls a transmission and a hydraulic controller. During an inertia phase where an input speed of the transmission changes toward a synchronous speed in a gear stage after a shift, the controller sets an oil pressure of a specific frictional engagement of a plurality of frictional engagement devices to an oil pressure that, at a time of the shift, exceeds a first oil pressure to set a transmission torque capacity equal to a first drive torque applied to the specific frictional engagement device of a drive torque outputted from a prime mover, but is less than a second oil pressure to set a transmission torque capacity equal to a second drive torque which is the first drive torque to which has been added an inertia torque generated by inertia on a prime mover side accompanying a change in speed ratio.

6 Claims, 6 Drawing Sheets

(51) Int. Cl.
*B60W 10/06* (2006.01)
*B60W 30/19* (2012.01)
*F02D 41/02* (2006.01)
*F02P 5/15* (2006.01)
*F16H 3/66* (2006.01)
*F16H 61/04* (2006.01)
*B60W 50/00* (2006.01)

(52) U.S. Cl.
CPC ............... *F16D 2500/3109* (2013.01); *F16D 2500/50293* (2013.01); *F16H 2061/0462* (2013.01)

(56) References Cited

U.S. PATENT DOCUMENTS

| | | | | |
|---|---|---|---|---|
| 2007/0149351 | A1* | 6/2007 | Inuta | F16H 61/0437 477/70 |
| 2008/0300104 | A1* | 12/2008 | Park | F16H 61/061 477/80 |
| 2010/0228449 | A1* | 9/2010 | Takahashi | F16H 61/061 701/51 |
| 2011/0246009 | A1 | 10/2011 | Hase et al. | |
| 2014/0297089 | A1 | 10/2014 | Tsuda et al. | |
| 2015/0120154 | A1* | 4/2015 | Masunaga | B60W 10/04 701/54 |
| 2015/0184740 | A1* | 7/2015 | Masunaga | F16H 61/04 701/51 |
| 2016/0017995 | A1 | 1/2016 | Kondo et al. | |
| 2017/0203746 | A1* | 7/2017 | Toyokawa | B60W 10/026 |
| 2017/0219029 | A1 | 8/2017 | Shiozaki et al. | |

FOREIGN PATENT DOCUMENTS

| | | |
|---|---|---|
| JP | 2007-138901 | 6/2007 |
| JP | 2010-159815 | 7/2010 |
| JP | 2011-218835 | 11/2011 |
| JP | 2013-154723 | 8/2013 |
| JP | 2016-159886 A | 9/2016 |
| JP | 2017-137883 | 8/2017 |
| WO | WO 2014/141368 A1 | 9/2014 |

* cited by examiner

|  | C1 | C2 | C3 | C4 | B1 | B2 | F1 |
|---|---|---|---|---|---|---|---|
| P |  |  |  |  |  |  |  |
| R |  |  |  | ○ |  |  | ○ |
| 1st | ○ |  |  |  |  | (○) | ○ |
| 2nd | ○ |  |  |  | ○ |  |  |
| 3rd | ○ |  | ○ |  |  |  |  |
| 4th | ○ |  |  | ○ |  |  |  |
| 5th | ○ | ○ |  |  |  |  |  |
| 6th |  | ○ |  | ○ |  |  |  |
| 7th |  | ○ | ○ |  |  |  |  |
| 8th |  | ○ |  |  | ○ |  |  |

○ : Engaged
Blank : Disengaged

SHIFT CONTROL SYSTEM FOR VEHICLE

CROSS REFERENCE TO RELATED APPLICATION

The present invention claims the benefit of Japanese Patent Application No. 2017-033453 filed on Feb. 24, 2017 with the Japanese Patent Office, the disclosure of which is incorporated herein by reference in its entirety.

BACKGROUND

Field of the Invention

Embodiments of the present disclosure relate to the art of a shift control system for a vehicle having an automatic transmission.

Discussion of the Related Art

JP-A-2007-138901 describes a control system of an automatic transmission for vehicle that establishes a plurality of gear stages of different speed ratios by selectively engaging a plurality of frictional engagement devices, and that, after increasing/decreasing a drive torque transmitted from an engine to an input shaft, outputs the increased/decreased drive torque. In this kind of shift control system, an inertia torque of a prime mover accompanying a change in speed ratio is added to a drive torque outputted from the prime mover, at a time of a shift due to an accelerator pedal being depressed. As a result, a shift shock occurs due to a sudden change in an output torque of the automatic transmission. Accordingly, in order to prevent such disadvantage, the shift control system taught by JP-A-2007-138901 is configured to execute an ignition retard to retard an ignition timing of the engine in an inertia phase lowering a turbine speed to a synchronous speed in a gear stage after the shift.

JP-A-2013-154723 and JP-A-2011-218835 also describe control systems configured to suppress a shift shock by causing a clutch disengaged during a shift to slip.

JP-A-2010-159815 describes a control system configured to suppress a shift shock by causing a lockup clutch of a torque converter to slip during a shift.

JP-A-2005-313786 describes a control system for a geared transmission configured to cause a lockup clutch, disposed between an engine and an automatic transmission, to slip or release the lockup clutch when a rotational speed of an input shaft of the transmission is substantially synchronized with a synchronous speed of a gear stage to be established after a shifting operation.

According to the teachings of JP-A-2007-138901, the ignition retard is executed to reduce fluctuations in output shaft torque. However, there is a limit to an ignition retard amount, and sometimes, due to an operating state, fluctuations in output shaft torque cannot be sufficiently suppressed. Moreover, sometimes, due to lowering of engine output caused by ignition retard control, there is a deterioration in response of drive torque outputted when the accelerator pedal is depressed. Moreover, sometimes, fuel consumption or emissions deteriorate.

In the system taught by JP-A-2010-159815, drive torque is transmitted by a creep force, hence transmission torque decreases more compared to during a completely engaged state. Therefore, response of a drive power transmitted to a drive wheel worsens with respect to depressing of an accelerator pedal.

According to the teachings of JP-A-2005-313786, the lockup clutch is coupled between a crank shaft of the engine and the input shaft of the automatic transmission, hence it is possible to block inertia torque of the engine being transmitted to the automatic transmission. However, transmission of inertia torque occurring on a downstream side of the lockup clutch including the automatic transmission cannot be blocked.

Therefore, there is further room for improvement in improving drivability by overcoming a sluggish feeling given to a driver, while suppressing a shift shock resulting from, for example, a shifting operation by the driver to accelerate a vehicle.

SUMMARY

This disclosure has been made noting the above-described technical problems, and has an object of providing a shift control system for vehicle that can improve an acceleration feeling while suppressing a shift shock resulting from a shifting operation to accelerate the vehicle.

A shift control system of the present invention is applied to a vehicle including: a plurality of engagement devices set to torque capacities based on oil pressures supplied; a geared transmission coupled to an output shaft of a prime mover and including the plurality of engagement devices; and a hydraulic controller that controls oil pressures with respect to the plurality of engagement devices in order to shift a gear stage of the transmission to another gear stage having a different speed ratio. In order to achieve the above-described object, a controller is configured so that, during a shift of the transmission, in an inertia phase where an input speed of the transmission changes toward a synchronous speed in a gear stage after the shift, the controller controls an oil pressure of a predetermined engagement device to be engaged to establish the gear stage after the shift. In addition, in the inertia phase, the oil pressure of the predetermined engagement device is set to an oil pressure which is higher than a first oil pressure to set a torque capacity for transmitting from the prime mover a first drive torque acting on the predetermined engagement device, but lower than a second oil pressure to set a torque capacity for transmitting a second drive torque which is a total of an inertia torque caused by a change in speed of the prime mover and the first drive torque.

In a non-limiting embodiment, the predetermined engagement device may include an engagement device maintained in an engaged state before and after the shift.

In a non-limiting embodiment, the predetermined engagement device may include an engagement device completely engaged by having its engagement oil pressure boosted earliest of the engagement devices to be engaged after the shift.

In a non-limiting embodiment, the first oil pressure may include a theoretical value found based on a torque acting on the predetermined engagement device, and the second oil pressure may include an oil pressure to set a torque capacity for transmitting a torque calculated by multiplying the theoretical value by a predetermined safety factor.

In a non-limiting embodiment, the shift control system may further include a detector that detects a speed difference between an input member by which a drive torque is transmitted from the prime mover in the predetermined engagement device and an output member engaged with the input member, and the inertia phase includes a synchronous phase where the speed difference will be in a range exceeding a first threshold value, but being less than a second threshold value that has a larger value than the first threshold value.

In a non-limiting embodiment, the shift control system may further include a torque converter provided on an input side of the transmission. The torque converter has a lockup clutch that, by engaging, transmits unchanged to the transmission a torque of the prime mover. Moreover, the controller may be configured so as to engage the lockup clutch in the inertia phase.

As mentioned above, due to this invention, in the inertia phase, the oil pressure of the predetermined engagement device establishing the gear stage after the shift, of the plurality of engagement devices is set to an oil pressure which is higher than the first oil pressure, but lower than the second oil pressure. Therefore, the predetermined engagement device in power-on shifting can transmit the first drive torque to an output rotary member, but slips when the second drive torque is transmitted, thereby not transmitting the second drive torque to the output rotary member. For the above-described reason, an acceleration feeling can be improved while a shift shock is suppressed.

BRIEF DESCRIPTION OF THE DRAWINGS

Features, aspects, and advantages of exemplary embodiments of the present invention will become better understood with reference to the following description and accompanying drawings, which should not limit the invention in any way.

DETAILED DESCRIPTION OF THE PREFERRED EMBODIMENT(S)

Figure 1:
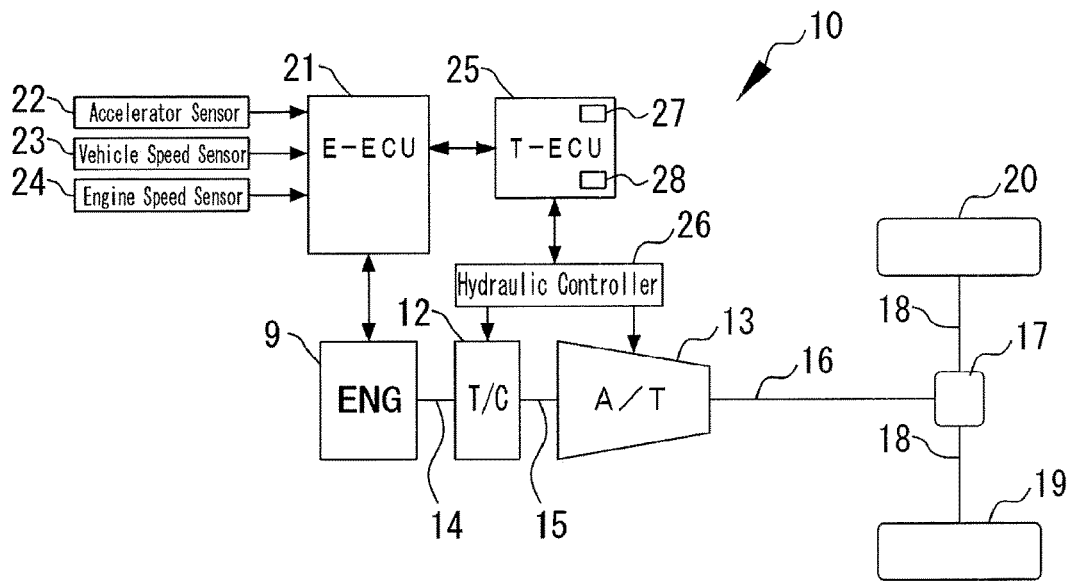
FIG. 1 is a schematic illustration showing a structure of the vehicle to which the shift control system according to the embodiment is applied.

Hereinafter, embodiments of the present disclosure will be described with reference to the accompanying drawings. FIG. 1 schematically shows one example of a vehicle employed in the present invention. As shown in FIG. 1, a vehicle 10 includes an engine (ENG) 9, a torque converter (T/C) 12, and a geared automatic transmission (A/T) 13 (as will be simply called the "transmission" hereinafter). The torque converter 12 is coupled to an output shaft (or crank shaft) 14 of the engine 9. An input shaft 15 of the transmission 13 is coupled to an output side of the torque converter 12, and a drive torque outputted from the engine 9 is transmitted to the input shaft 15. An output shaft 16 of the transmission 13 is coupled to a differential gear unit 17 as a final reduction gear unit. Left and right axles 18 are coupled to the differential gear unit 17. A drive torque transmitted to the output shaft 16 is transmitted to drive wheels 19, 20 via the axles 18. Note that although in FIG. 1, the drive wheels 19, 20 are configured as rear wheels of the vehicle 10, they are not limited to this, and may be configured as front wheels or may be configured as front wheels and rear wheels.

Fuel supply to the engine 9 or ignition timing of the engine 9, and so on, can be electrically controlled by an electronic control unit for engine (to be abbreviated as the "E-ECU" hereinafter) 21. The E-ECU 21 is configured having a microcomputer as its main constituent, and is configured so as to perform a calculation using incident data or previously stored data and transmit a result of the calculation to the engine 9 in the form of a command signal. An accelerator sensor 22, a vehicle speed sensor 23, and an engine speed sensor 24, and so on, are connected to the E-ECU 21, and the likes of a vehicle speed, an accelerator position, and an engine speed Ne are sent to the E-ECU 21 from each of the sensors 22-24. Note that the engine 9 includes the likes of a gasoline engine or a diesel engine. Moreover, the vehicle 10 may include a hybrid vehicle having a prime mover combining an engine and a motor.

The transmission 13 configures part of a power transmission path between the input shaft 15 and the output shaft 16. A speed ratio of the transmission 13 is changed by manipulating a plurality of frictional engagement devices (as will be simply called the "engagement device" hereinafter) including a clutch and a brake, in response to a shift demand. The clutch includes an input rotary member and an output rotary member that are caused to couple by an oil pressure. The brake includes a rotary member and a fixed member, and the rotary member is selectively coupled to the fixed member by an oil pressure. In this way, the transmission 13 is configured so as to execute clutch-to-clutch shifting.

The transmission 13 is controlled via a hydraulic controller 26 by an electronic control unit for transmission (to be abbreviated as the "T-ECU" hereinafter) 25. The T-ECU 25 is configured having a microcomputer as its main constituent, and is data-communicably connected to the above-described E-ECU 21. The T-ECU 25 is inputted with data relating to the likes of vehicle speed or accelerator position, via the E-ECU 21, and performs a calculation using those inputted data and previously stored data including a shifting diagram. A calculation result is transmitted to the hydraulic controller 26 in the form of a command signal (including an oil pressure command value). The shifting diagram is a map that determines a region of a gear stage by the vehicle speed and the accelerator position, and a condition to execute an upshift is satisfied when an operating point governed by the vehicle speed and the accelerator position crosses an upshift line. By contrast, a condition to execute a downshift is satisfied when the operating point crosses a downshift line. The T-ECU 25 as a controller includes: a vibration reducer 27; and a detector 28 that detects a speed difference between an input member and an output member in a gear stage after a shift.

Figure 2:
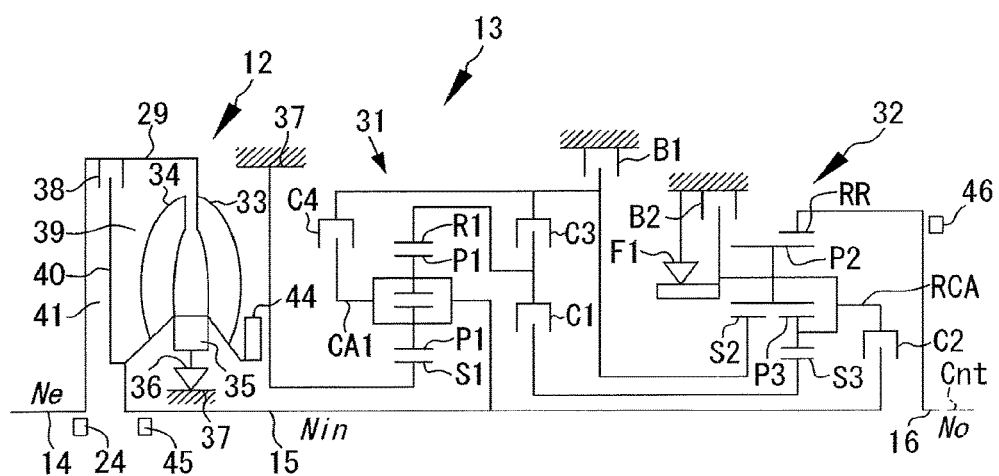
FIG. 2 is a skeleton diagram schematically showing a structure of the automatic transmission.

A structure of the transmission 13 is shown in FIG. 2 in more detail. As shown in FIG. 2, the transmission 13 includes: a double pinion planetary gear unit 31 disposed on a front side of the vehicle 10; and a Ravigneaux planetary gear unit 32 disposed on a rear side of the vehicle 10. A drive torque delivered from the output shaft 14 of the engine 9 is delivered to the transmission 13 via the torque converter 12. The torque converter 12 has: a pump impeller 33 which is integrally provided in a front cover 29 coupled to the output shaft 14; a turbine runner 34 disposed facing the pump impeller 33; and a stator 35 disposed between these pump impeller 33 and turbine runner 34. The stator 35 is coupled, via a one-way clutch 36, to a stationary member 37 such as a casing of the transmission 13, for example.

The torque converter 12 has a lockup clutch 38. By controlling a differential pressure between an oil pressure of an oil pressure chamber 39 housing the pump impeller 33 and the turbine runner 34 and an oil pressure of an oil pressure chamber 41 facing the oil pressure chamber 39 via a lockup piston 40, the lockup piston 40 can be selectively engaged with the lockup clutch 38. By engaging the lockup piston 40 with the lockup clutch 38, the turbine runner 34 can be rotated integrally with the pump impeller 33 via the front cover 29. Moreover, it is also possible for the lockup piston 40 to be engaged with a slip, in the lockup clutch 38. In FIG. 2, a gear unit 30 or the torque converter 12 are configured substantially symmetrically with respect to a central axis Cnt of the output shaft 14, and a half below the central axis Cnt is omitted. Note that the torque converter 12 may be built in to the transmission 13.

In the planetary gear unit 31, a sun gear S1 is coupled to the stationary member 37 to serve as a fixed element, and a ring gear R1 serves as an output element. A plurality of pinion gears P1 interpose between the sun gear S1 and the ring gear R1, and are rotatably supported by a carrier CA1. The carrier CA1 is connected to the turbine runner 34 through the input shaft 15 to serve as an input element. In the embodiment, a speed of the input shaft 15 corresponds to an input speed (Nin).

In the Ravigneaux planetary gear unit 32, a long pinion P2 engages with a first sun gear S2, a ring gear RR, and a short pinion P3, a second sun gear S3 engages with the short pinion P3, and, moreover, the long pinion P2 and the short pinion P3 are supported by a carrier RCA. The ring gear RR is coupled to the output shaft 16 to serve as an output element, and a speed of the output shaft 16 corresponds to an output speed (No).

The engagement device includes a first clutch C1, a second clutch C2, a third clutch C3, a fourth clutch C4, a first brake B1, and a second brake B2. The first clutch C1 selectively couples the ring gear R1 and the second sun gear S3. The second clutch C2 selectively couples the input shaft 15 and the carrier RCA. The third clutch C3 selectively couples the ring gear R1 and the first sun gear S2. The fourth clutch C4 selectively couples the carrier CA1 and the first sun gear S2.

The first brake B1 stops rotation of the first sun gear S2, and the second brake B2 stops rotation of the carrier RCA. Note that a one-way clutch F1 is provided in parallel with the second brake B2. The one-way clutch F1 is engaged by the carrier RCA rotating oppositely to a rotation direction of the output shaft 16, and prevents reverse rotation of the carrier RCA.

The torque converter 12 includes a mechanical oil pump 44. The oil pump 44 raises pressure of an oil by being driven by rotation outputted from the engine 9, and supplies the pressure-raised oil to the hydraulic controller 26. The transmission 13 is provided with the engine speed sensor 24 that detects the engine speed (Ne) and a turbine speed sensor 45 that detects an output shaft speed (a speed (Nin) of the input shaft 15) of the torque converter 12. Furthermore, the transmission 13 is provided with an output shaft speed sensor 46 that detects a speed (No) of the ring gear (output element) RR. Signals from the engine speed sensor 24, the turbine speed sensor 45, and the output shaft speed sensor 46 are sent to the T-ECU 25 and the E-ECU 21. A vehicle speed (V) corresponds to the speed (No) of the ring gear RR.

Figures 3, 4:
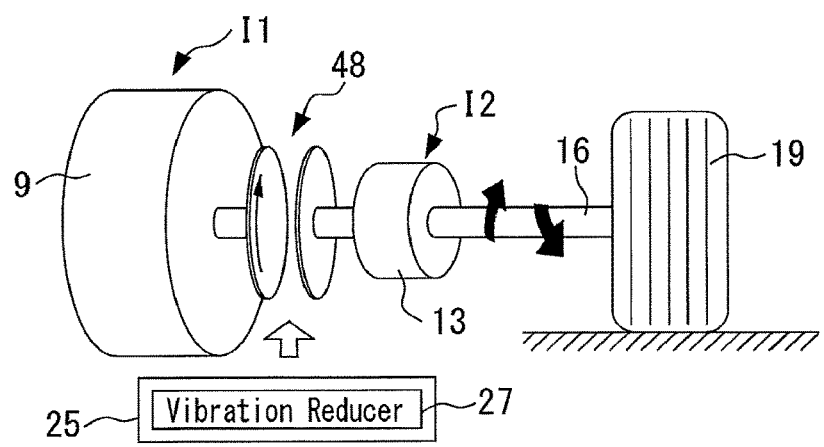
FIG. 3 is a table showing engagement states of the frictional engagement devices in each gear stage.
FIG. 4 is a schematic illustration showing a torsion model in a drive system including the automatic transmission.

Engagement states of the frictional engagement devices in each gear stage of the transmission 13 are indicated in FIG. 3. As shown in FIG. 3, a 1st stage, a 2nd stage, a 3rd stage, a 4th stage, a 5th stage, a 6th stage, a 7th stage, and an 8th stage can be established in the transmission 13. In FIG. 3, "O" represents engagement of the engagement device, blank represents disengagement of the engagement device, and "(O)" represents that the engagement device may be not only engaged but also disengaged.

When the gear stage is shifted from the 1st stage to the 5th stage, engagement of the first clutch C1 is maintained. Similarly, when the gear stage is shifted from the 5th stage to the 8th stage, engagement of the second clutch C2 is maintained. Such a clutch that is engaged before a shift and remains engaged after the shift corresponds to a target engagement device of the present embodiment. Moreover, in the case of a specific shift pattern where two clutches are disengaged and another two clutches are engaged during a shift, the plurality of engagement devices caused to engage to establish the gear stage after the shift, are engaged sequentially. In the present embodiment, a shift between any gear stage from the 1st stage to the 4th stage and any gear stage from the 6th stage to the 8th stage corresponds to the specific shift pattern. Specifically, the engagement device completely engaged by having its engagement oil pressure boosted earliest, of the engagement devices caused to engage in the case of the specific shift pattern, will be the target engagement device. An example of the specific shift pattern is the case of skipping down from the 8th stage to the 3rd stage straddling the 5th stage. The 3rd stage is established by the first clutch C1 and the third clutch C3 engaging as shown in FIG. 3, and when shifting from the 8th stage to the 3rd stage, the third clutch C3 is first to be completely engaged. Therefore, in such a case, the third clutch C3 will be the target engagement device. Note that an order of the engagement devices being completely engaged after start of a shift is predetermined for each shift pattern.

FIG. 4 shows a torsion model in a drive system including the transmission 13. In FIG. 4, Il indicates a moment of inertia of an engine system including the engine 9, and 12 indicates a moment of inertia of a transmission system including the transmission 13. In order to simplify the drawing, a plurality of engagement devices are shown as one engagement device 48 between the engine 9 and the transmission 13.

During power-on shifting caused by the accelerator pedal being depressed, a change in speed ratio is accompanied by a first drive torque applied to the target engagement device of the drive torque outputted from the engine 9 having added thereto a fluctuation torque including a low frequency component felt by a driver as a front-rear vibration of the vehicle 10. As a result, a second drive torque which is the first drive torque to which the fluctuation torque has been added, is transmitted to the output shaft 16 of the transmission 13. Moreover, the moment of inertia Il of the engine 9 is larger than the moment of inertia 12 of the transmission system. Therefore, an inertia torque generated along with a change in speed of the engine 9 will be larger than an inertia torque generated along with a change in speed of the transmission system.

This second drive torque, after passing through the engaged engagement device 48 and the transmission 13, is increased at a final reduction ratio by the differential gear unit 17 to be transmitted to the axle 18. Immediately after this second torque is transmitted to the drive wheel 19 and grip has occurred between a road surface and the drive wheel 19, a reaction force against the drive power acts on the axle 18. As a result, the engine 9 and the transmission 13 roll, and a vibration acts on a mounting section where the engine 9 or transmission 13 are attached to the vehicle 10. That vibration is a transient vibration including a primary natural frequency as a torsion vibration of the drive system. In other words, the second drive torque is transmitted to the output shaft 16 via the engaged engagement device 48 to appear in the vehicle 10 in the form of a shift shock. Assuming a mass of the engine 9 to be M1 and a mass of the transmission 13 to be M2, a natural period including the engine 9 and the transmission 13 is expressed as $\sqrt{(K/M1+M2)}$. On the other hand, a natural period in the case where later-mentioned vibration reduction is executed on the engagement device 48 is expressed as $\sqrt{(K/M2)}$, and in the above-described expressions, "K" is a spring coefficient (torsional rigidity) including the output shaft 16 (drive shaft) of the transmission 13 and a drive wheel 19 system.

The T-ECU 25 includes the vibration reducer 27 that reduces a vibration of the target engagement device. The vibration reducer 27 is configured to adjust an engagement oil pressure of the target engagement device higher than a first oil pressure to set a torque capacity of the target engagement device capable of transmitting the first drive torque, but lower than a second oil pressure to set a torque capacity of the target engagement device capable of transmitting the second drive torque. Specifically, the torque capacity of the target engagement device is set such that when the first drive torque is applied to the target engagement device, the first drive torque can be transmitted without a slip occurring, and when the second drive torque is applied to the target engagement device, a torque is transmitted accompanied by slipping. Such vibration reduction is executed in an inertia phase where input speed of the transmission 13 changes toward a speed that can be found from a speed ratio of the gear stage after the shift and the vehicle speed. In the present embodiment, a certain period from a start to close to a finish time point of the inertia phase is described as a "synchronous phase". By executing the vibration reduction, the low frequency component included in the second drive torque can be removed. As a result, resonance between the natural vibration frequency of the transmission system and a frequency of the vibration occurring due to the second drive torque, can be avoided.

Figure 5:
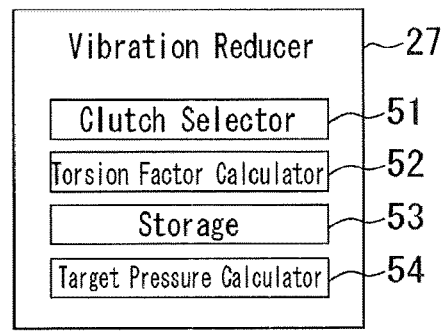
FIG. 5 is a block diagram showing functions of the vibration reducer.

FIG. 5 shows functions of the vibration reducer 27. As shown in FIG. 5, the vibration reducer 27 includes a clutch selector 51, a torsion factor calculator 52, a storage 53, and a target pressure calculator 54.

Figure 6:
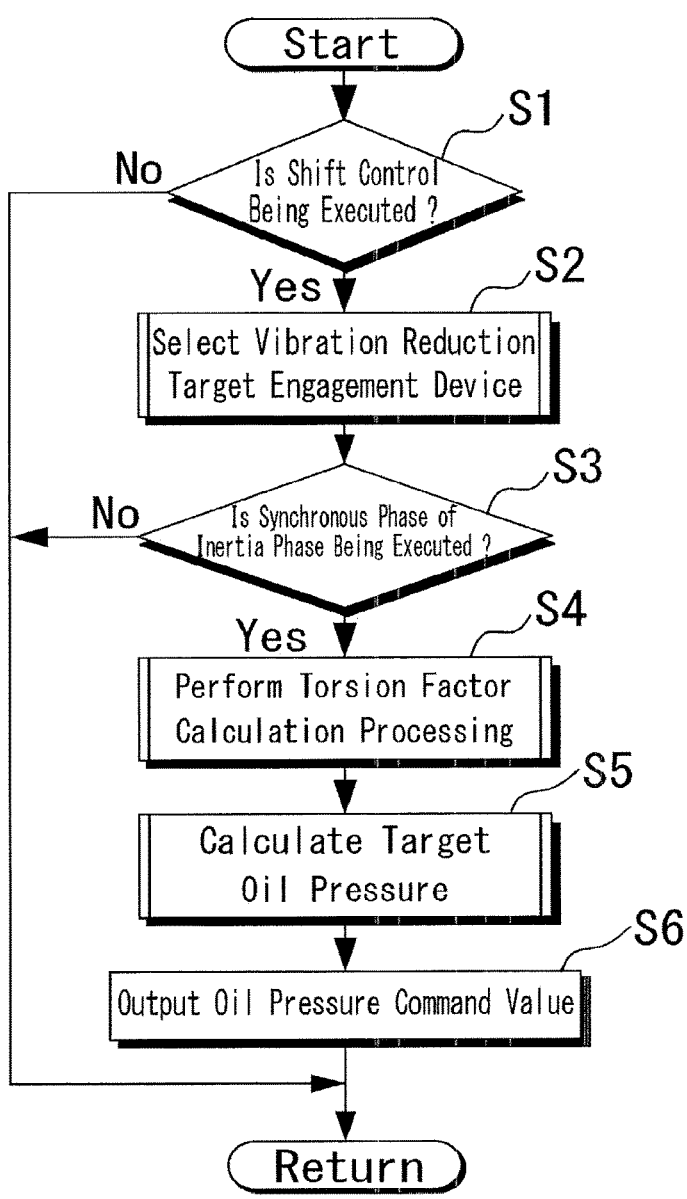
FIG. 6 is a flowchart showing one example of a routine executed by the vibration reducer.

FIG. 6 shows one example of a routine executed by the T-ECU 25. In step S1, the vibration reducer 27 judges whether shift control is in the process of being executed or not. If the answer in step S1 is Yes, the routine moves to step S2, and if the answer in step S1 is No, the routine is returned.

In step S2, the clutch selector 51 selects the target engagement device of the frictional engagement devices establishing the gear stage after the shift. Then, the routine moves to step S3.

In step S3, it is determined whether, at present, the shift control is in the synchronous phase of the initial phase or not. Specifically, in step S3, a speed difference between the input rotary member and the output rotary member of the target engagement device is detected by the detector 28. The speed of the input rotary member corresponds to the speed of the input shaft 15, in other words, the turbine speed (Nin). The synchronous phase corresponds to a period when the speed difference is in a range exceeding a first threshold value but being less than a second threshold value that has a larger value than the first threshold value. Therefore, it can be judged whether the shift control is in the synchronous phase or not based on the speed difference obtained from the detector 28. If the answer in step S3 is Yes, the routine moves to step S4, and if the answer in step S3 is No, the routine is returned.

In step S4, the torsion factor calculator 52 calculates a torsion factor for finding a peak value of the second drive torque. Then, the routine moves to step S5.

In step S5, the target pressure calculator 54 finds the torque capacity of the target engagement device based on the torsion factor calculated by the torsion factor calculator 52, and finds a target oil pressure to be supplied to the target engagement device based on the torque capacity found.

In step S6, the T-ECU 25 outputs to the hydraulic controller 26 an oil pressure command value corresponding to the target oil pressure found by the target pressure calculator 54, whereby the target oil pressure is applied to the target engagement device.

Figure 7:
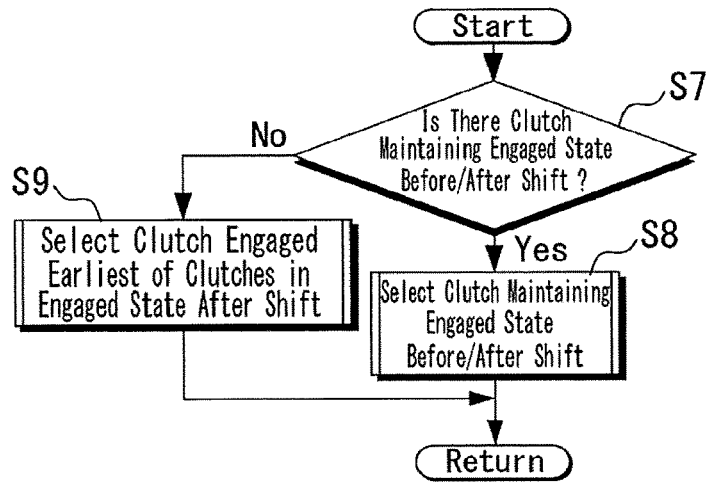
FIG. 7 is a flowchart showing one example of a routine executed by the clutch selector.

FIG. 7 shows one example of a routine for selecting the target engagement device. In step S7, it is judged whether there exists an engagement device to be maintained in an engaged state before and after the shift, or not. If the answer in step S7 is Yes, the routine moves to step S8, and if the answer in step S7 is No, the routine moves to step S9.

In step S8, the clutch selector 51 selects as the target engagement device the engagement device whose engagement is to be maintained before and after the shift.

In step S9, the clutch selector 51 selects as the target engagement device the engagement device to be engaged earliest temporally, of the plurality of engagement devices to be engaged after start of the shift.

Figure 8:
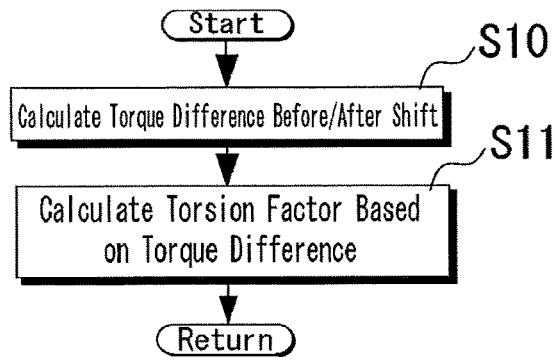
FIG. 8 is flowchart showing one example of a routine executed by the torsion factor calculator.

FIG. 8 shows one example of a routine for calculating the torsion factor. In step S10, the torsion factor calculator 52 calculates a difference between before and after the shift, of an estimated output torque of the engine 9. The estimated engine output torque is found based on an actual engine speed and a throttle position (or intake air amount), with reference to a first map stored in the storage 53.

Then, in step S11, the torsion factor is calculated based on a torque difference calculated in step S10. The torsion factor calculator 52 finds the torsion factor representing a parameter for estimating a magnitude of the vibration to occur in the vehicle 10, based on the previously mentioned torque difference, by referring to a second map stored in the storage 53. Then, the routine is returned.

Figure 9:
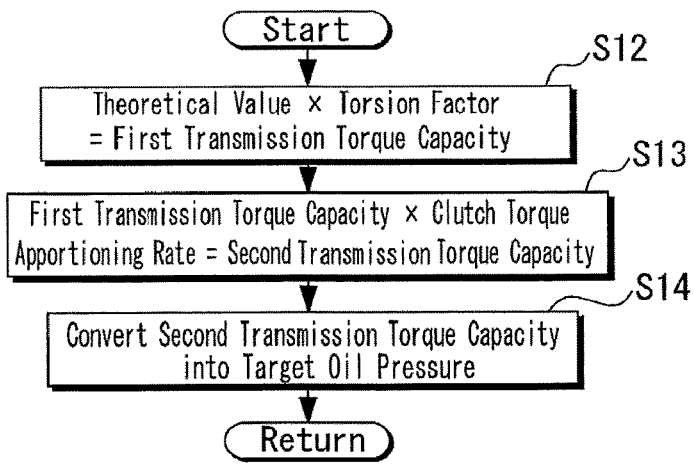
FIG. 9 is a flowchart showing one example of a routine executed by the target pressure calculator.

FIG. 9 shows one example of a routine for calculating the target oil pressure. In step S12, the target pressure calculator 54 calculates a first torque capacity by multiplying a theoretical value by the torsion factor calculated in step S11. Specifically, the above-described theoretical value can be found based on a torque acting on the target engagement device when the gear stage after the shift has been established.

In step S13, a second torque capacity is calculated by multiplying the first torque capacity found in step S12 by a proportion of transmission torque of the plurality of engagement devices establishing the gear stage after the shift.

For example, when shifting to the 2nd stage, the first brake B1 and the first clutch C1 are engaged. In this case, if a gear ratio of the second stage is, for example, "1.9", a torque portion transmitted by the first clutch C1 will be "0.9" with respect to a torque acting on the first brake B1 being "1". Specifically, the proportion of transmission torque of the first clutch C1 caused to engage in the 2nd stage will be "0.9/1.9".

In step S14, the target oil pressure to be supplied to the target engagement device is found based on the second torque capacity found in step S13. The target pressure calculator 54 finds the target oil pressure to be supplied to the target engagement device based on the second torque capacity, with reference to a third map stored in the storage 53. Then, the routine is returned.

Note that, instead of referring to the third map, the target oil pressure may be calculated from the second torque capacity using the equation shown below.

$$Pc = 4/((Dpo^2 - Dpi^2) \cdot \pi)(4 \cdot TC1/(n \cdot \mu \cdot (Do \cdot Di)) + Fr).$$

In the above equation, "Pc" indicates a target oil pressure (kpa) of the first clutch C1, "TC1" indicates a torque capacity (Nm) of the first clutch C1, "μ" indicates a coefficient of friction of the first clutch C1, "n" indicates the number of frictional surfaces, "Dpo" indicates a piston large diameter (m), "Dpi" indicates a piston small diameter (m), "Fr" indicates a piston return spring set load (N), "Do" indicates a frictional surface large diameter (m) of the first clutch C1, and "Di" indicates a frictional surface small diameter (m) of the first clutch C1.

Figure 10:
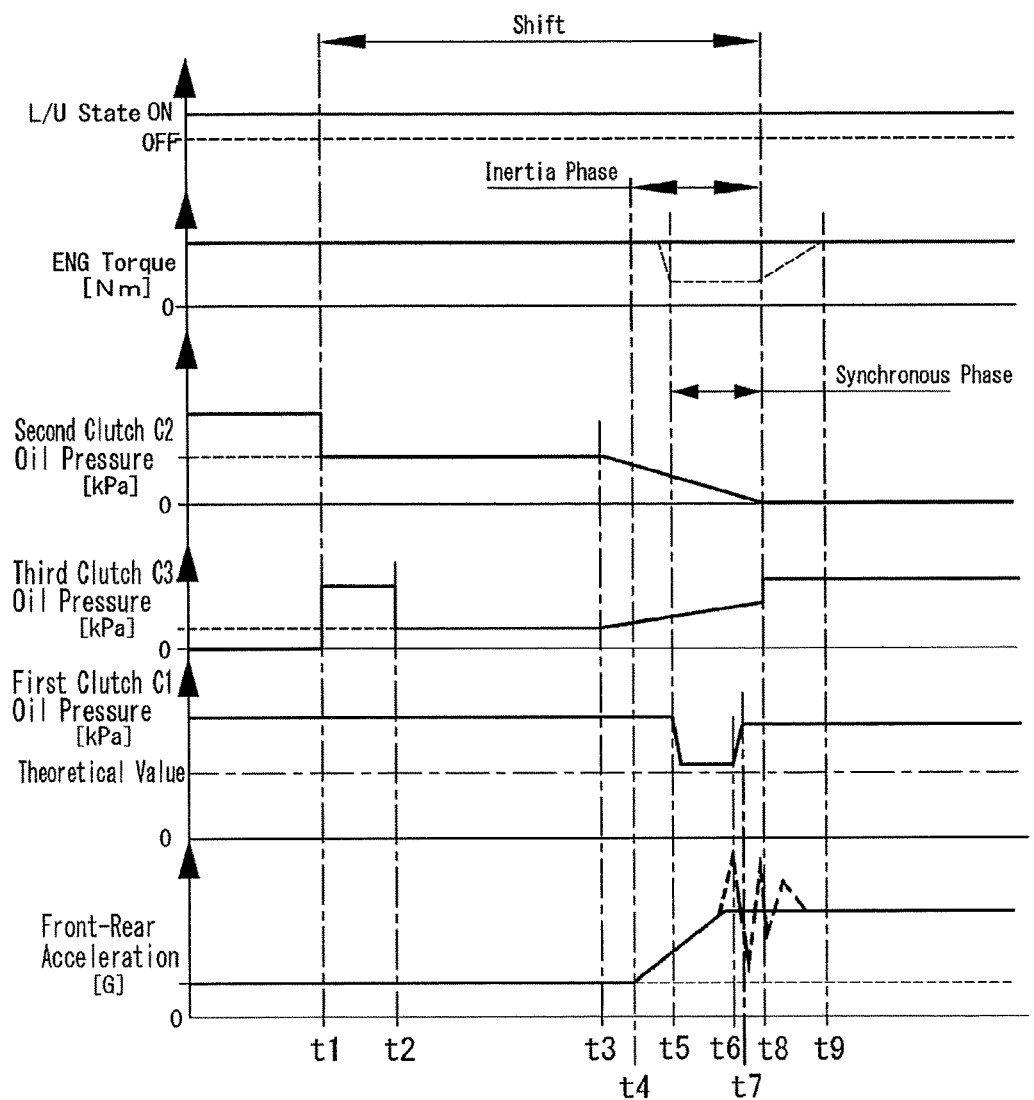
FIG. 10 is a time chart showing a situation during a shifting operation from the 5th stage to the 3rd stage.

FIG. 10 shows one example of an operation in a skip downshift from the 5th stage to the 3rd stage. Specifically, FIG. 10 shows changes in an engagement state of the lockup clutch (L/U), an engine output torque (Nm), an oil pressure command value of the second clutch C2, an oil pressure command value of the third clutch C3, an oil pressure command value of the first clutch C1, and an actual front-rear acceleration (G) of the vehicle 10.

Before time t1, the accelerator pedal is being depressed, and the engine output torque is being maintained at a constant amount based on a target engine torque. Therefore, the vehicle is being run at a certain vehicle speed (V) or more, and the lockup clutch is set to ON.

At time t1, a downshift from the 5th stage to the 3rd stage is demanded, and shift control is started. As explained using FIG. 3, in the downshift from the 5th stage to the 3rd stage, the second clutch C2 is disengaged and the third clutch C3 engaged, and engagement of the first clutch C1 is maintained before and after the shift. Therefore, the first clutch C1 will be the target engagement device.

When shift control is started, fast-fill control to temporarily set the oil pressure command value for the third clutch C3 to a high value is executed in order to promptly raise the oil pressure of the third clutch C3. In addition, the oil pressure of the second clutch C2 is lowered from an engagement oil pressure to a theoretical value. Note that the engagement oil pressure is calculated by multiplying the theoretical value by a certain safety factor. The theoretical value is a theoretical value of the oil pressure found based on a torque applied to the engagement device.

At time t2, the oil pressure of the third clutch C3 after the fast-fill control has finished is lowered to a stand-by pressure for transmitting torque. As a result, the second clutch C2 slip-engages and the third clutch is held at close to a stroke end of the piston. Specifically, the third clutch C3 is applied with an oil pressure by which a drive plate and a driven plate make contact but not enough to transmit torque.

At time t3, a sweep down is performed so that the oil pressure of the second clutch C2 gradually lowers at a predetermined certain change rate. Simultaneously to this, a sweep up is performed so that the oil pressure to the third clutch C3 gradually rises at a predetermined certain change rate. As a result, there begins a torque phase in which part of the torque that had been transmitted by the second clutch C2 to be disengaged is transmitted by the third clutch C3 to be engaged. In the torque phase, the speed (NinM) of the input shaft 15 is lowered to the synchronous speed in the gear stage of the 3rd stage.

At time t4, magnitudes of transmission torque of the second clutch C2 and transmission torque of the third clutch C3 invert. As a result, the speed of the input shaft, in other words, the turbine speed (Nt) begins to change toward the synchronous speed in the gear stage of the 3rd stage, the inertia phase begins, and the acceleration (G) of the vehicle 10 rises. At this time point, the T-ECU 25 detects the speed difference between the turbine speed (Nt) and the speed of the output shaft of the third clutch C3, via the detector 28.

At time t5, the speed difference between the turbine speed (Nt) and the speed of the output shaft of the third clutch C3 falls in a certain range and the synchronous phase begins. In this situation, the vibration reducer 27 executes vibration reduction on the first clutch C1 to be maintained in engagement. The synchronous phase having been reached is detected by the speed difference falling in a range exceeding the first threshold value but being less than the second threshold value that has a larger value than the first threshold value. Before time t5, the first clutch C1 is maintained at the engagement oil pressure calculated by multiplying the theoretical value by a certain safety factor.

The engagement oil pressure is an oil pressure to set the torque capacity for transmitting the second drive torque, and is calculated by multiplying the theoretical value by a certain safety factor. The theoretical value is a value found based on a drive torque applied to the first clutch C1, in other words, an oil pressure to set the torque capacity for transmitting the first drive torque. The theoretical value corresponds to a first oil pressure in the embodiment, and the engagement oil pressure corresponds to a second oil pressure in the embodiment.

At time t5, the oil pressure of the first clutch C1 is an oil pressure which is lower than the engagement oil pressure but higher than the theoretical value. As a result, the shift shock shown by dotted lines that occurs in the synchronous phase can be suppressed.

At time t6, the actual turbine speed (Nt) reaches close to the synchronous speed found using the speed ratio of the gear stage of the 3rd stage and the vehicle speed, and vibration reduction finishes. The turbine speed (Nt) having reached close to the synchronous speed in the gear stage of the 3rd stage is detected by a deviation of the turbine speed (Nt) and the synchronous speed having entered a certain positive range.

When the vibration reduction finishes at time t7, the oil pressure of the first clutch C1 is raised to the engagement oil pressure.

At time t8, when the turbine speed (Nt) gets close to the speed of the output shaft of the third clutch C3, the oil pressure of the second clutch C2 is lowered so that the second clutch C2 is completely disengaged, and the oil pressure of the third clutch C3 is raised to the engagement oil pressure. As a result, the downshift finishes.

The T-ECU 25 determines a start timing of the vibration reduction by monitoring the speed difference between the speed (Nin) of the input shaft 15 and the synchronous speed in the gear stage of the 3rd stage. Up to now, the oil pressure of a clutch underwent feedback control in order that drive torque increased smoothly without a shift shock. On the other hand, in the present embodiment, due to the vibration reduction being executed in the synchronous phase of the inertia phase, the previously mentioned feedback control of the oil pressure of the third clutch C3 is not executed. Instead, the oil pressure of the third clutch C3 is swept up from an initial pressure based on a predetermined constant time change rate.

Due to the oil pressure of the third clutch C3 being swept up, an engagement shock occurs at a time of engagement of the third clutch C3. The engagement shock is a cause of increase in the inertia torque or drive torque of the engine, and also a cause of the shift shock. In the present embodiment, an increase in the torque causing the shift shock results in the first clutch C1 slipping. As a result, an input side member and an output side member of the first clutch C1 can be isolated. Causing the first clutch C1 to slip makes it possible for vibration to be reduced by changing the natural frequency included in the drive torque to a high frequency, even when clutch-to-clutch shifting is rapidly implemented. In addition, shift time can be reduced.

Moreover, up to now, ignition retard has been implemented to suppress the shift shock, before the inertia phase finishes, as in the engine torque shown by the broken lines in FIG. 10. In this case, finish of the shift control is extended from time t8 to time t9 when the ignition retard finishes. In the present embodiment, there is no need to execute ignition retard, hence shift time can be further reduced. Furthermore, the shift shock can be suppressed, even when the ignition retard cannot be executed due to a restriction such as an operating state of the engine 9.

The downshift explained using FIG. 10 is described as a shift from the 5th stage to the 3rd stage. However, the vibration reduction of the present embodiment can be applied also to the above-mentioned specific shift pattern.

Figure 11:
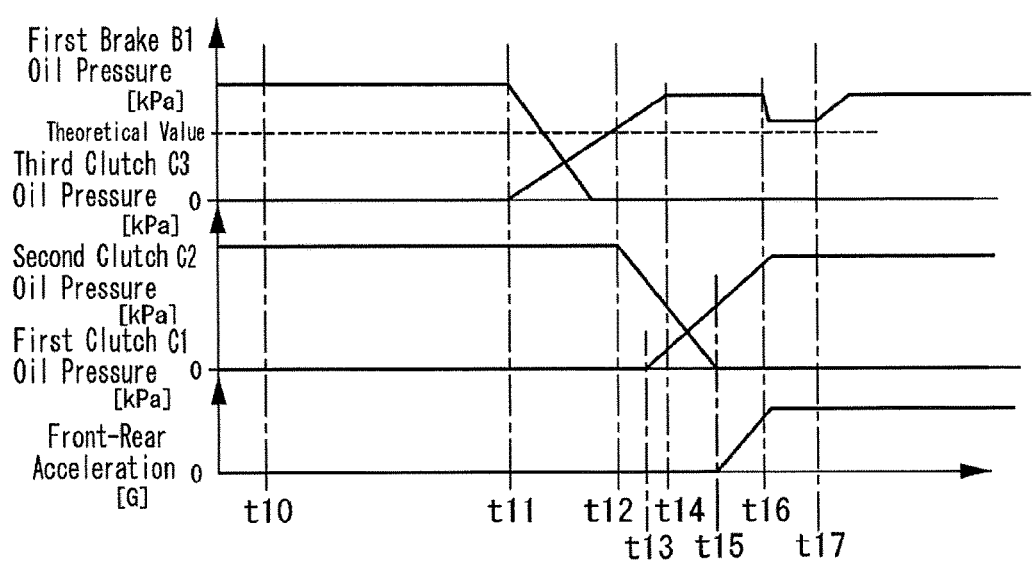
FIG. 11 is a time chart showing a situation during a shifting operation from the 8th stage to the 3rd stage.

FIG. 11 shows one example of operation of each section in a skip downshift from the 8th stage to the 3rd stage.

The 8th stage is established at time t10 shown in FIG. 11. Then, before reaching time til, a downshift to the 3rd stage is demanded.

The skip downshift is started at time t11. As a result, the oil pressure of the first brake B1 is substantively swept down to zero, and the oil pressure of the third clutch C3 is swept up to the engagement oil pressure. During this period, the oil pressure of the second clutch C2 is maintained at the engagement oil pressure, and the oil pressure of the first clutch C1 is maintained at a disengagement oil pressure. Note that an order of controlling the oil pressures of the engagement devices establishing the gear stage after the shift is predetermined.

Before time t12, the oil pressure of the first brake B1 is lowered to the disengagement oil pressure, and the oil pressure of the third clutch C3 rises. At time t12, before a torque acts on the third clutch C3, the oil pressure of the second clutch C2 is swept down toward the disengagement oil pressure.

At time t13, the oil pressure of the first clutch C1 is swept up toward the engagement oil pressure.

At time t14, the oil pressure of the second clutch C2 is lowered toward the disengagement oil pressure, and the oil pressure of the first clutch C1 is continuingly raised toward the engagement oil pressure. At time t14, before a torque acts on the first clutch C1, the oil pressure of the third clutch C3 is raised to the engagement oil pressure.

At time t15, the oil pressure of the second clutch C2 lowers to the disengagement oil pressure. Then, torque is transmitted to the first clutch C1, whereby front-rear acceleration (G) of the vehicle 10 rises.

Time t16 is a time point when the first clutch C1 reaches the engagement oil pressure, or a time point before the first clutch C1 reaches the engagement oil pressure. At time t16, the vibration reducer 27 executes vibration reduction to lower the oil pressure of the third clutch C3 to a vibration reduction oil pressure.

Thus, in the skip downshift from the 8th stage to the 3rd stage, vibration reduction is started before the first clutch C1 reaches the engagement oil pressure. Moreover, even in the skip downshift from the 8th stage to the 3rd stage, vibration reduction may be executed in the above-mentioned synchronous phase.

At time t17, the turbine speed (Nt) reaches close to the speed of the output shaft of the first clutch C1, and vibration reduction finishes. As a result, the oil pressure of the first clutch C1 is boosted from an oil pressure for lowering vibration, to the engagement oil pressure.

The present invention is not limited to each of the above-mentioned embodiments, and may be appropriately changed in a range not departing from the object of the present invention. For example, although the shift described in each of the above-mentioned embodiments is described by a downshift, the present invention is not limited to this, and vibration reduction may be executed also in an upshift.

What is claimed is:

1. A shift control system for vehicle, comprising:
   a plurality of engagement devices set to torque capacities based on oil pressures supplied;
   a geared transmission coupled to an output shaft of a prime mover and including the plurality of engagement devices;
   a hydraulic controller that controls the oil pressures with respect to the plurality of engagement devices in order to shift a gear stage of the transmission to another gear stage having a different speed ratio; and
   a controller that controls the transmission,
   wherein the controller is configured so that, during a shift of the transmission, in an inertia phase where an input speed of the transmission changes toward a synchronous speed in a gear stage after the shift, the controller controls an oil pressure of a predetermined engagement device to be engaged to establish the gear stage after the shift, and
   in the inertia phase, the oil pressure of the predetermined engagement device is set to an oil pressure which is higher than a first oil pressure to set a torque capacity for transmitting from the prime mover a first drive torque acting on the predetermined engagement device, but lower than a second oil pressure to set a torque capacity for transmitting a second drive torque which is a total of an inertia torque caused by a change in speed of the prime mover and the first drive torque.

2. The shift control system for vehicle according to claim 1, wherein
   the predetermined engagement device is maintained in an engaged state before and after the shift.

3. The shift control system for vehicle according to claim 1, wherein
   the predetermined engagement device is completely engaged by having an engagement oil pressure of the predetermined engagement device boosted earliest of the engagement devices to be engaged after the shift.

4. The shift control system for vehicle according to claim 1, wherein
   the first oil pressure includes a theoretical value found based on a torque acting on the predetermined engagement device, and
   the second oil pressure includes an oil pressure to set a torque capacity for transmitting a torque calculated by multiplying the theoretical value by a predetermined safety factor.

5. The shift control system for vehicle according to claim 1, further comprising:

a detector that detects a speed difference between an input member by which a drive torque is transmitted from the prime mover in the predetermined engagement device and an output member engaged with the input member, wherein the inertia phase includes a synchronous phase where the speed difference will be in a range exceeding a first threshold value, but being less than a second threshold value that has a larger value than the first threshold value.

6. The shift control system for vehicle according to claim 1, further comprising:

a torque converter provided on an input side of the transmission, wherein the torque converter includes a lockup clutch that, by engaging, transmits unchanged to the transmission a torque of the prime mover, and the controller is configured to engage the lockup clutch in the inertia phase.

\* \* \* \* \*